(12) United States Patent
Cho et al.

(10) Patent No.: US 9,815,195 B2
(45) Date of Patent: Nov. 14, 2017

(54) DETACHABLE DEVICE FOR LOADING UNIT OF ROBOT, ROBOT, AND CONTROLLING METHOD OF ROBOT USING THE SAME

(71) Applicant: KOREA INSTITUTE OF MACHINERY & MATERIALS, Daejeon (KR)

(72) Inventors: Jang Ho Cho, Daejeon (KR); Hyun Soo Woo, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 7 days.

(21) Appl. No.: 14/953,536

(22) Filed: Nov. 30, 2015

(65) Prior Publication Data

US 2017/0043479 A1 Feb. 16, 2017

(30) Foreign Application Priority Data

Aug. 13, 2015 (KR) ........................ 10-2015-0114531

(51) Int. Cl.

| B25J 9/00 | (2006.01) |
| B25J 9/16 | (2006.01) |
| H01F 7/02 | (2006.01) |
| H01F 7/04 | (2006.01) |
| H01F 7/20 | (2006.01) |

(52) U.S. Cl.
CPC .......... *B25J 9/1612* (2013.01); *H01F 7/0252* (2013.01); *H01F 7/04* (2013.01); *H01F 7/20* (2013.01)

(58) Field of Classification Search
CPC combination set(s) only.
See application file for complete search history.

(56) References Cited

U.S. PATENT DOCUMENTS 5,954,446 A * 9/1999 Ireland ..................... B23K 9/32
403/11
5,993,365 A * 11/1999 Stagnitto .............. B25J 15/0491
414/736

(Continued)

FOREIGN PATENT DOCUMENTS

| EP | 0947167 | 10/1999 |
| JP | 11-318921 | 11/1999 |

(Continued)

*Primary Examiner* — Jonathan L Sample
(74) *Attorney, Agent, or Firm* — Lex IP Meister, PLLC

(57) ABSTRACT

A detachable device of a loading unit for a robot, detachably combining the loading unit to a connection unit of the robot, includes: a first magnet unit provided in the loading unit and having a first magnet pattern; a second magnet unit provided in the connection unit, having a second magnet pattern including a pattern that corresponds to the first magnet pattern, and combined with the first magnet unit by a magnetic force generated by power applied thereto; a pattern recognition unit recognizing an object held by the loading unit and one of the first magnet pattern and the pattern corresponding to the first magnet pattern; and a matching control unit controlling power applied to the second magnet unit to apply magnetic attraction force to the first magnet pattern from a part of the second magnet pattern according to operation of the pattern recognition unit.

7 Claims, 8 Drawing Sheets

(56) References Cited

U.S. PATENT DOCUMENTS

| | | | | |
|---|---|---|---|---|
| 8,328,495 | B2* | 12/2012 | Bufano | H01L 21/67196 414/288 |
| 9,020,636 | B2* | 4/2015 | Tadayon | B25J 5/02 700/247 |
| 9,315,321 | B2* | 4/2016 | Browne | B65G 1/137 |
| 2002/0140242 | A1* | 10/2002 | Byers | B25B 11/002 294/86.4 |
| 2008/0218299 | A1* | 9/2008 | Arnold | B81C 1/00007 335/306 |
| 2009/0278642 | A1* | 11/2009 | Fullerton | G01D 18/00 335/284 |
| 2011/0009028 | A1* | 1/2011 | Gurdin | A63F 9/0819 446/132 |
| 2011/0031839 | A1* | 2/2011 | Fullerton | G01D 18/00 310/152 |
| 2011/0056908 | A1* | 3/2011 | Fukushima | G11B 5/851 216/22 |
| 2011/0234345 | A1* | 9/2011 | Onodera | A61K 9/0009 335/302 |
| 2011/0298325 | A1* | 12/2011 | Rombach | H02K 15/03 310/156.16 |
| 2012/0010749 | A1* | 1/2012 | van der Merwe | A61F 2/54 700/264 |
| 2012/0152877 | A1* | 6/2012 | Tadayon | B25J 5/02 212/224 |
| 2012/0235636 | A1* | 9/2012 | Partovi | H02J 7/025 320/108 |
| 2012/0256715 | A1* | 10/2012 | Fullerton | H01F 7/021 335/285 |
| 2012/0319808 | A1* | 12/2012 | Fullerton | H01F 7/0284 335/306 |
| 2013/0217946 | A1* | 8/2013 | Balakin | A61N 5/10 600/1 |
| 2014/0111296 | A1* | 4/2014 | Fullerton | H01F 7/02 335/284 |
| 2014/0180328 | A1 | 6/2014 | Vaccaro et al. | |
| 2014/0277739 | A1* | 9/2014 | Kornbluh | B25J 9/0006 700/260 |
| 2014/0358275 | A1* | 12/2014 | Browne | A45C 13/1069 700/214 |
| 2014/0360305 | A1* | 12/2014 | Olds | B25J 15/0441 74/490.01 |
| 2015/0034311 | A1* | 2/2015 | Tunget | E21B 7/20 166/250.14 |
| 2015/0105798 | A1* | 4/2015 | Lohmeier | A61B 34/71 606/130 |
| 2015/0105799 | A1* | 4/2015 | Lohmeier | A61B 34/71 606/130 |
| 2015/0105800 | A1* | 4/2015 | Lohmeier | A61B 34/71 606/130 |
| 2015/0164593 | A1* | 6/2015 | Lohmeier | A61B 34/71 606/130 |
| 2015/0173729 | A1 | 6/2015 | Lohmeier et al. | |
| 2015/0173730 | A1 | 6/2015 | Lohmeier et al. | |
| 2015/0173731 | A1 | 6/2015 | Lohmeier et al. | |
| 2015/0240987 | A1* | 8/2015 | DesJardien | G01C 11/02 348/46 |
| 2015/0343238 | A1* | 12/2015 | Balakin | A61N 5/1069 600/1 |
| 2016/0051433 | A1* | 2/2016 | Patoglu | B25J 9/1607 606/130 |

FOREIGN PATENT DOCUMENTS

| KR | 10-2014-0145208 | 12/2014 |
|---|---|---|
| KR | 10-2015-0018599 | 2/2015 |

* cited by examiner

DETACHABLE DEVICE FOR LOADING UNIT OF ROBOT, ROBOT, AND CONTROLLING METHOD OF ROBOT USING THE SAME

This application claims priority to and the benefit of Korean Patent Application Nos. 10-2015-0114531 filed in the Korean Intellectual Property Office on Aug. 13, 2015, the entire contents of which are incorporated herein by reference.

BACKGROUND OF THE INVENTION (a) Field of the Invention

The present invention relates to a detachable device for a loading unit of a robot, a robot using the same, and a method for controlling the robot. More particularly, it relates to a detachable device that can stably detachably combine a loading unit to a designated unit of a robot according to an object that is loaded to the loading unit and can promptly detach the loading unit from the designated unit of the robot in an emergency situation to protect the object loaded to the loading unit, a robot using the same, and a method for controlling the robot.

(b) Description of the Related Art

In general, robots offer convenience to users through various types of movements.

For example, a patient who has been partially or wholly paralyzed due to a stroke, traumatic brain damage, or cerebral palsy needs time, manpower, and cost for rehabilitation. Thus, a robot for rehabilitation has been researched and developed to reduce time, manpower, and cost required for rehabilitation of a patient who has been partially or wholly paralyzed due to brain damage.

The rehabilitation robot may be classified into an end effector type robot that meets a hand or a lower arm of the patient having a disability at one point, and an exoskeleton type of robot that is designed to match an axis of an anatomical joint of an arm of the body.

Velcro or a belt has been used to attach a part of a user's body to the rehabilitation robot, but an assistant always needs to help with the attachment. In addition, it is difficult to attach a part of the user's body at the right position in the rehabilitation robot, and the rehabilitation robot has been inefficiently used because the robot needs to be stopped for the attachment.

Further, when the part of the user's body is held by the rehabilitation robot, the held part of the user's body needs to be changed according to a characteristic of the user. In addition, since the user's body is partially held by the rehabilitation robot, when the robot malfunctions, an accident may occur with the user due to movement of the malfunctioning robot or the user may be injured.

Korean Patent Laid-Open Publication No. 2014-0145208 disclosed a method related to a surgical robot system.

The above information disclosed in this Background section is only for enhancement of understanding of the background of the invention and therefore it may contain information that does not form the prior art that is already known in this country to a person of ordinary skill in the art.

SUMMARY OF THE INVENTION

According to one aspect of the present invention, a detachable device of a loading unit for a robot is provided to stably combine a loading unit to a connection unit of the robot according to an object held by the loading unit, and protect the object held by the loading unit by promptly separating the loading unit from the connection unit of the robot in an emergency situation.

According to another aspect of the present invention, a robot using the detachable device of the loading unit and a method for controlling the robot can be provided.

A detachable device of a loading unit for a robot, detachably combining the loading unit to a connection unit of the robot, includes: a first magnet unit provided in the loading unit and having a first magnet pattern; a second magnet unit provided in the connection unit, having a second magnet pattern including a pattern that corresponds to the first magnet pattern, and combined with the first magnet unit by a magnetic force generated by power applied thereto; a pattern recognition unit recognizing an object held by the loading unit and one of the first magnet pattern and the pattern corresponding to the first magnet pattern; and a matching control unit controlling power applied to the second magnet unit to apply magnetic attraction force to the first magnet pattern from a part of the second magnet pattern according to operation of the pattern recognition unit.

The first magnet unit may include a plurality of permanent magnets forming the first magnet pattern, and the first magnet pattern is a predetermined magnet pattern for identification of the loading unit.

The first magnet unit may include: a plurality of pattern electromagnet portion having a magnetic force by power applied thereto; a pattern identification portion selecting whether to apply power to a part of the plurality of pattern electromagnet portions corresponding to the first magnet pattern; and an identification power portion applying power to the part selected by the pattern identification portion among the plurality of pattern electromagnet portions to form the first magnet pattern.

At least one of the first magnet unit and the second magnet unit may be provided with an interference shielding unit that shields an electric field. The detachable device of the loading unit for the robot according to the exemplary embodiment of the present invention may further include a second position selection unit provided in the connection unit while being separated from the second magnet unit and combined with the first position selection unit by a magnetic force.

The pattern recognition unit may include at least one of a data input unit to which input data with respect to an object held by the loading unit is input and a magnetic sensing unit provided in the connection unit and sensing the first magnet pattern or a pattern corresponding to the first magnet pattern, and the matching control unit may control power applied to the second magnet unit according to at least one of a result of matching the input data or pattern data based on the input data with predetermined matching data and whether or not the magnetic sensing unit sensed the first magnet pattern or the corresponding pattern of the first magnet pattern.

The detachable device of the loading unit for the robot according to the exemplary embodiment of the present invention may further include: a detachment fixing unit provided in the loading unit while being separated from the first magnet unit; a detachment electromagnet unit provided in the connection unit while being separated from the second magnet unit and combined to the detachment fixing unit by a magnetic force generated by power applied thereto; and a detachment control unit controlling at least one of operation of the connection unit and power applied to the detachment electromagnet unit.

The detachable device of the loading unit for the robot according to the exemplary embodiment of the present invention may further include a detachment switch unit selecting whether power is applied in the detachment electromagnet unit.

A robot according to another exemplary embodiment of the present invention includes: a connection unit that is movable with respect to a robot main body to help rehabilitation exercise of a patient; a loading unit of which a part of a patient's body is installed in one side and the other side is detachably combined to the connection unit; and a detachable unit detachably combining the loading unit to the connection unit, the detachable unit may include: a first magnet unit provide in the loading unit for alignment of the connection unit and the loading unit and having a first magnet pattern; and a second magnet unit provided in the connection unit, having a second magnet pattern including a corresponding pattern of the first magnet pattern and combined with the first magnet unit, wherein the first magnet pattern is a unique pattern according to a patient or the loading unit.

The robot according to the other exemplary embodiment of the present invention may further include a prismatic joint unit adjusting the length of the connection unit corresponding to the loading unit or adjusting a position of the second magnet unit.

According to another exemplary embodiment of the present invention, a method for controlling a robot for detachably combining a loading unit to a connection unit of the robot is provided. The method includes: recognizing one of an object held by the loading unit and a first magnet pattern of a first magnet unit provided in the loading unit or a corresponding pattern of the first magnet pattern when the loading unit is supported by the connection unit; recognition data matching for selecting whether or not recognition data recognized through the pattern recognition matches predetermined matching data; and right positioning for applying power to the second magnet unit to provide magnetic attraction force to the first magnet pattern from a part of a second magnet pattern of a second magnet unit provided in the connection unit when the recognition data matches the predetermined matching data.

The pattern recognition may include data inputting for inputting input data with respect to an object held by the loading unit, and wherein the recognition data may include pattern data with respect to the first magnet pattern based on the input data, pattern data with respect to a corresponding pattern of the first magnet pattern based on the input data, or the input data input through the data inputting.

The pattern recognition may include magnetic sensing for sensing a first magnet pattern formed in the first magnet unit or a corresponding pattern of the first magnet pattern, and wherein the recognition data may include pattern data with respect to the first magnet pattern sensed through the magnetic sensing or pattern data with respect to the corresponding pattern of the first magnet pattern.

The method for controlling the robot according to the other exemplary embodiment of the present invention may further include: pattern identification for selecting whether or not power is applied to a part of a plurality of pattern electromagnet portions having a magnetic force by power applied before the magnetic sensing; and applying identification power for applying power to a part of the plurality of pattern electromagnet portions, selected through the pattern identification to form the first magnet pattern.

The method for controlling the robot according to the other exemplary embodiment of the present invention may further include, after the right positioning, fixing a loading unit for applying power to a detachment electromagnet unit provided in the connection portion for combination of a detachment fixing unit provided in the loading unit by a magnetic force generated from the detachment electromagnet unit.

The method for controlling the robot according to the other exemplary embodiment of the present invention may further include, before the right positioning, position adjusting for adjusting the length of the connection unit corresponding to the loading unit.

A method for controlling a robot for detachably combining a loading unit to a connection unit of the robot according to an exemplary embodiment of the present invention includes: right positioning the loading unit in the connection unit; after the right positioning, fixing the loading unit to combining a detachment fixing unit provided in the connection unit to a detachment electromagnet unit with a magnetic force generated according to power applied to the detachment electromagnet unit; and operation checking for checking at least one of operation of the connection unit and power applied in the fixing of the loading unit while the connection unit is moving, wherein when at least one of malfunctioning of the connection unit and blocking of power applied in the fixing of the loading unit is selected in the operation checking, and loading unit separation is performed to release the magnetic force of the detachment electromagnet unit for separation of the detachment electromagnet unit and the detachment fixing unit.

The detachable device of the loading unit for the robot, the robot using the same, and the method for controlling the robot according to the exemplary embodiment of the present invention can stably combine the loading unit to the connection unit of the robot according to an object held by the loading unit, and can protect the object held by the loading unit by promptly separating the loading unit from the connection unit of the robot in an emergency situation.

DETAILED DESCRIPTION OF THE EMBODIMENTS

Figure 1:
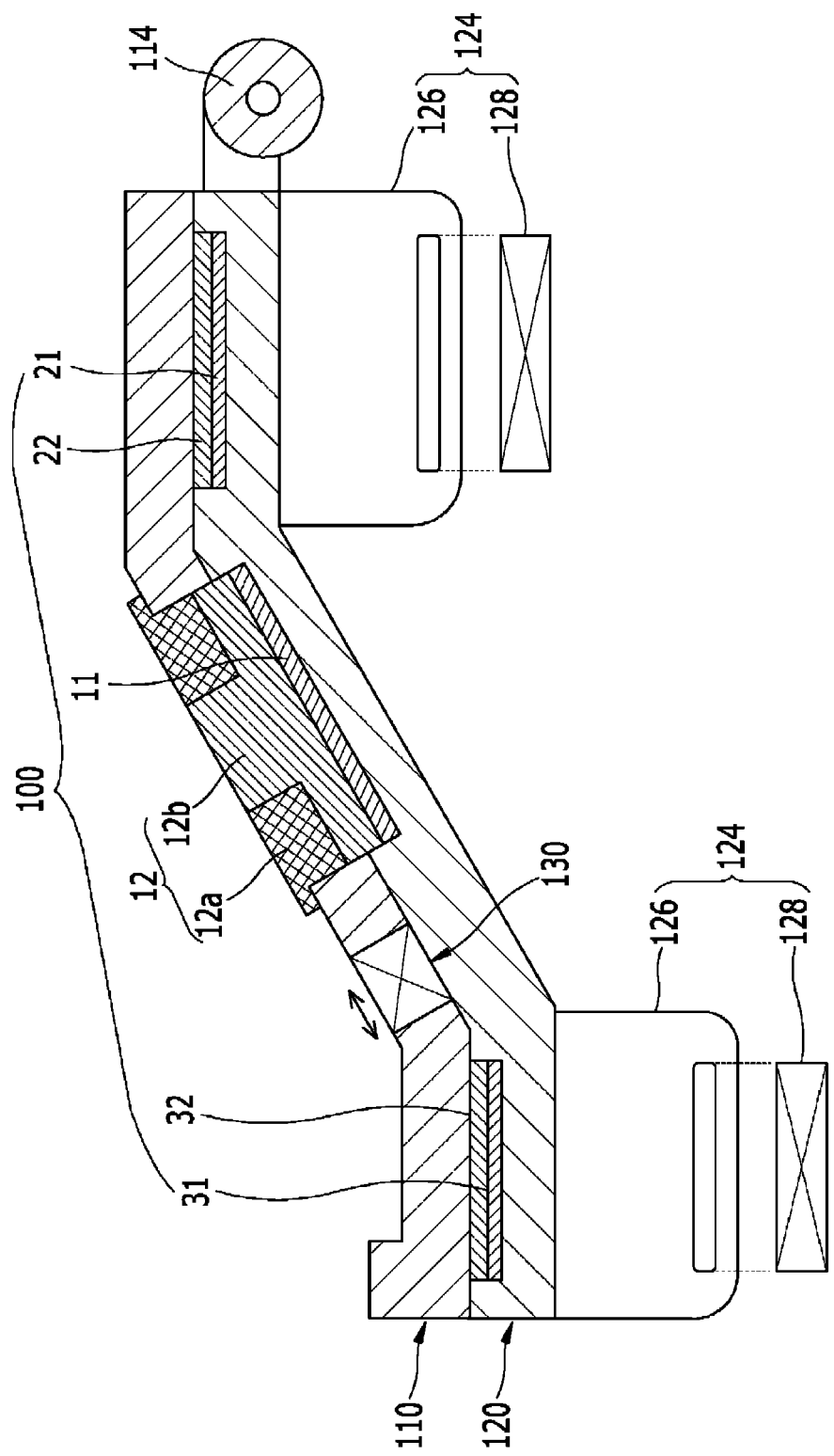
FIG. 1 illustrates a robot according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

A robot according to an exemplary embodiment of the present invention will now be described. A detachable device of a loading unit for a robot according to an exemplary embodiment of the present invention will be described as a detachable unit applied to a robot according to an exemplary embodiment of the present invention.

Figure 2:
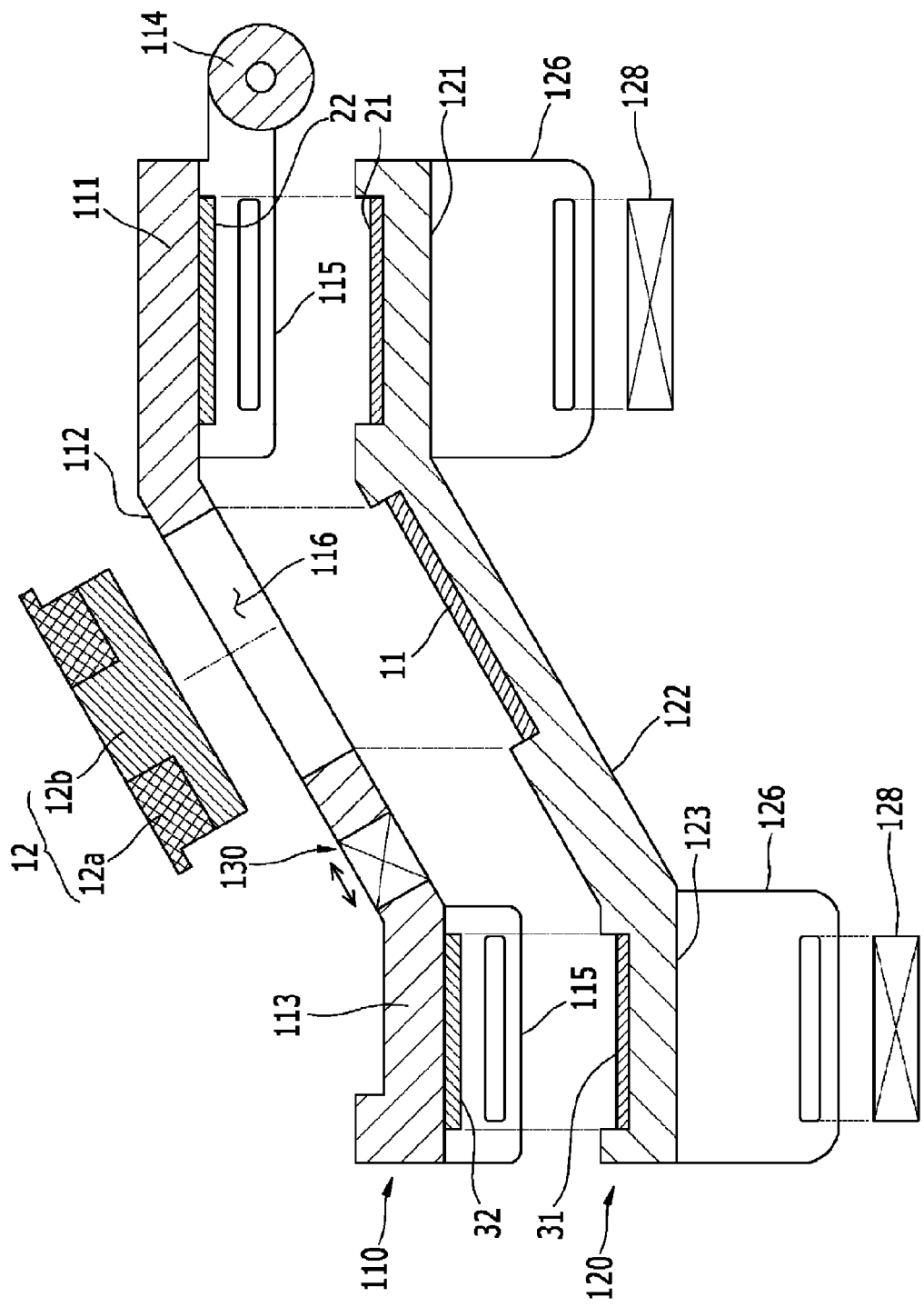
FIG. 2 is an exploded view of FIG. 1.
Figure 3:
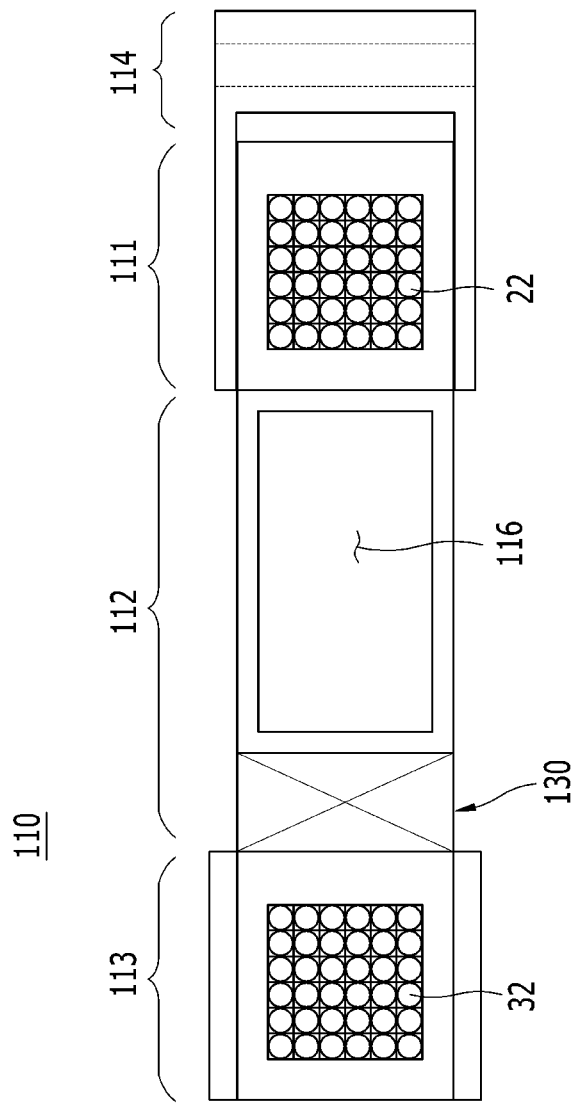
FIG. 3 illustrates a unit where a loading unit is expected to be loaded according to the exemplary embodiment of the present invention.
Figure 4:
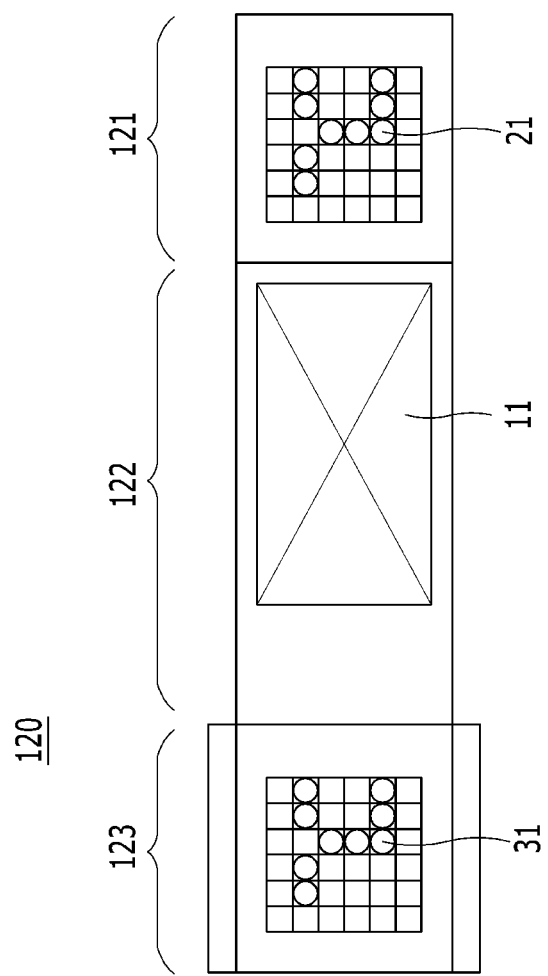
FIG. 4 illustrates a loading unit according to the exemplary embodiment of the present invention.
Figure 5:
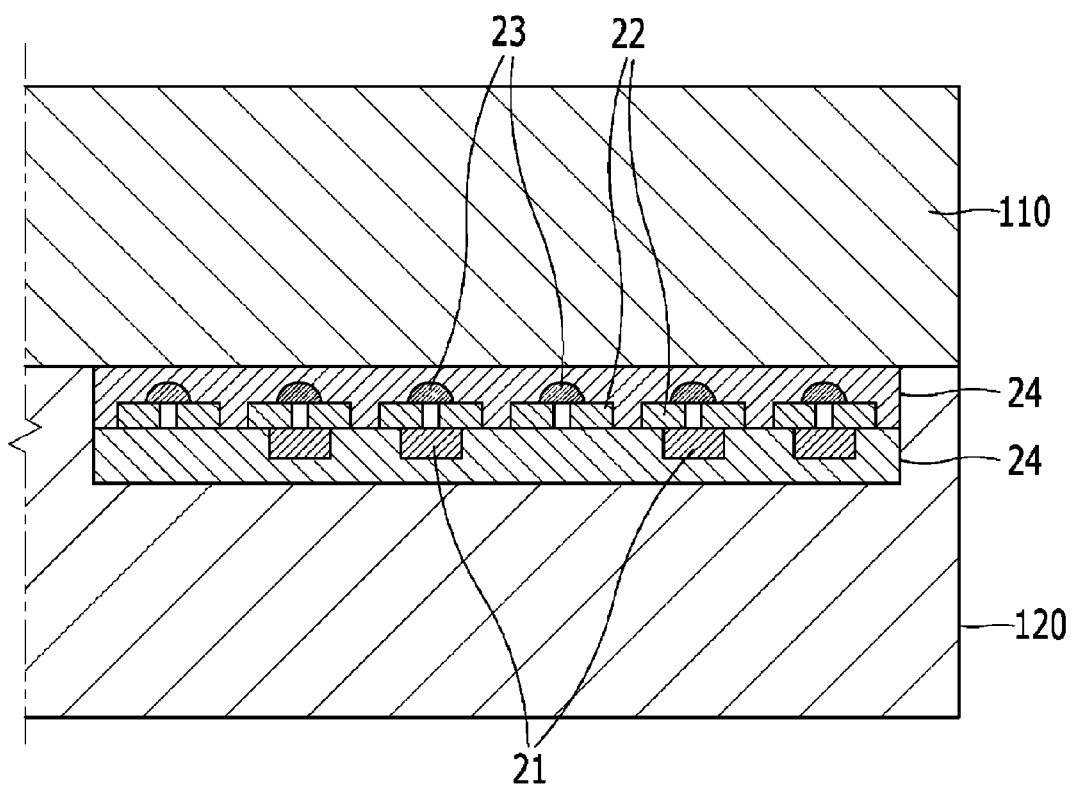
FIG. 5 illustrates a combined station of a first magnet unit and a second magnet unit in a detachable device of the loading unit for the robot according to the exemplary embodiment of the present invention.
Figure 6:
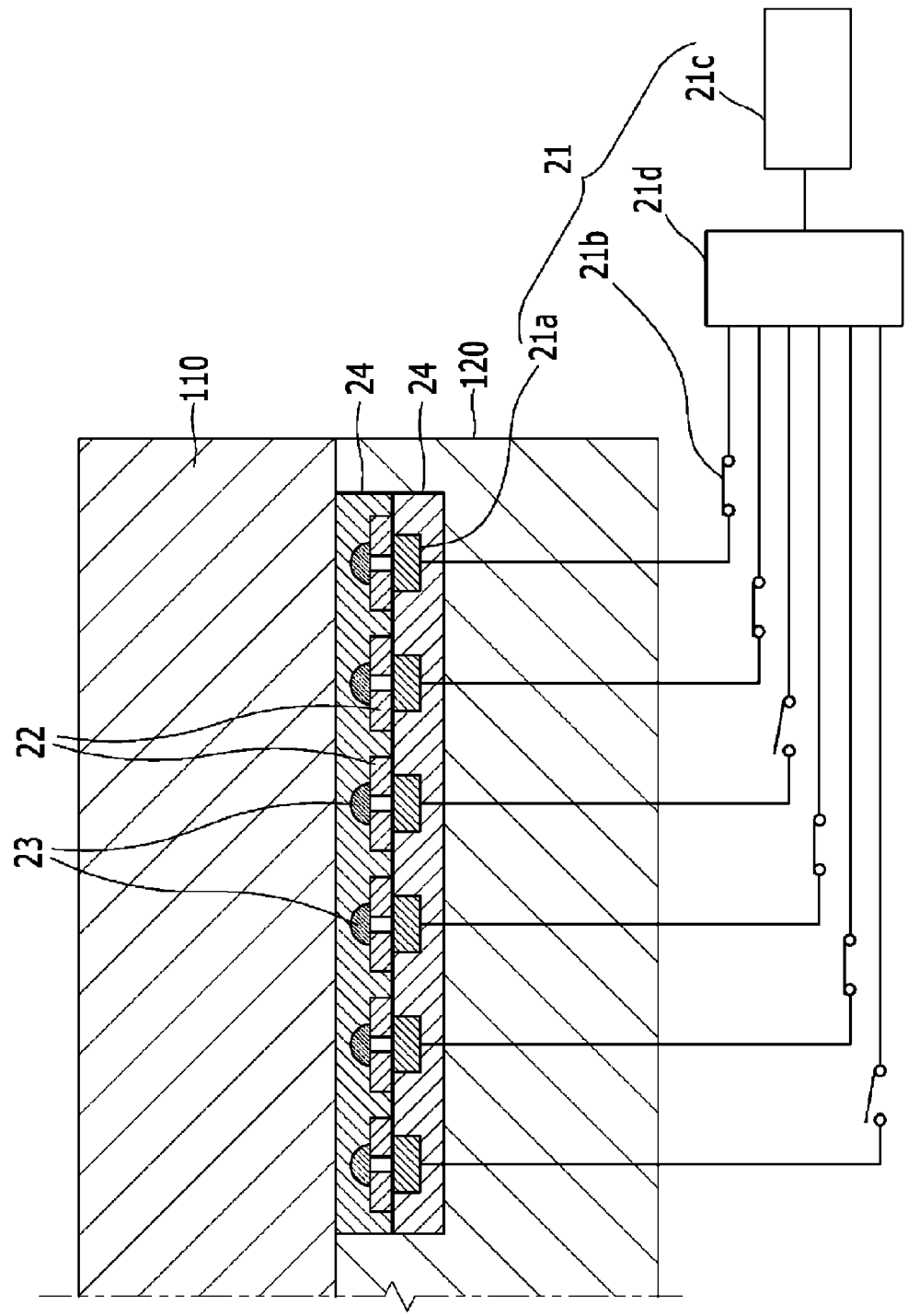
FIG. 6 illustrates a combined state of the first magnet unit and the second magnet unit that are deformed in the detachable device of the loading unit for the robot according to the exemplary embodiment of the present invention.
Figure 7:
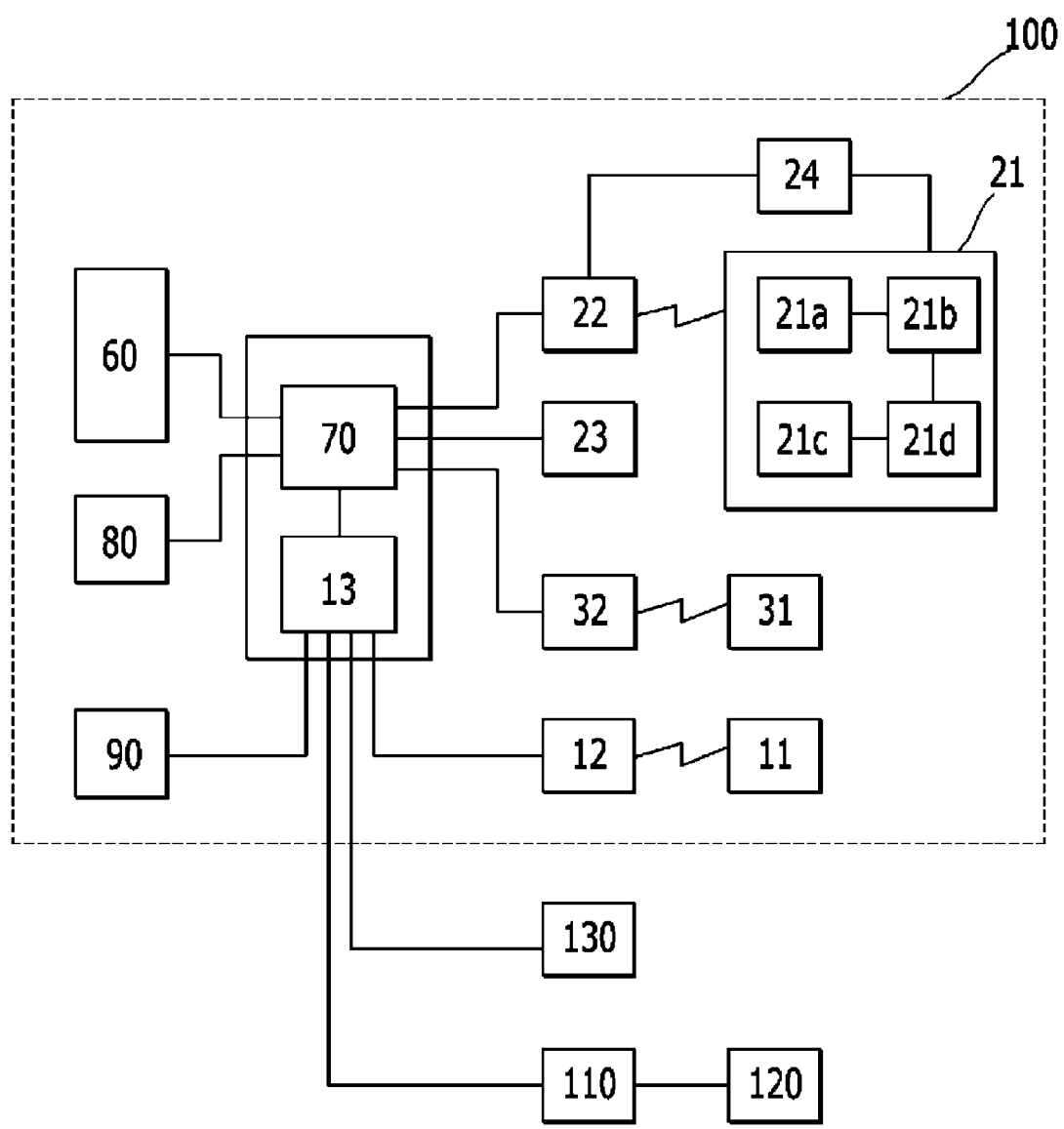
FIG. 7 is a block diagram illustrating the detachable device of the loading unit for the robot according to the exemplary embodiment of the present invention.

FIG. 1 illustrates a robot according to an exemplary embodiment of the present invention, FIG. 2 is an exploded view of FIG. 1, FIG. 3 illustrates a unit where a loading unit is loaded according to the exemplary embodiment of the present invention, FIG. 4 illustrates a loading unit according to the exemplary embodiment of the present invention, FIG. 5 illustrates a combined state of a first magnet unit and a second magnet unit in a detachable device of the loading unit for the robot according to the exemplary embodiment of the present invention, FIG. 6 illustrates a combined state of the first magnet unit and the second magnet unit that are deformed in the detachable device of the loading unit for the robot according to the exemplary embodiment of the present invention, and FIG. 7 is a block diagram illustrating the detachable device of the loading unit for the robot according to the exemplary embodiment of the present invention.

Referring to FIG. 1 to FIG. 7, a robot according to an exemplary embodiment of the present invention may move a loading unit 120 detachably combined to a unit 110 where the loading unit 120 (hereinafter, the unit 110 will be referred to as a connection unit 110 for convenience in description) is loaded by movement of the connection unit 110, and may move an object (e.g., a part of a user's body) held by the loading unit 120. The robot according to the exemplary embodiment of the present invention includes the connection unit 110, the loading unit 120, and a detachable unit 100.

The connection unit 110 is movably combined to a main body of the robot. The connection unit 110 may perform various types of operations. The connection unit 110 is movably combined to the robot main body through a robot combining unit 114. In the exemplary embodiment of the present invention, the robot combining unit 114 may be link-combined to the main body of the robot.

In the connection unit 110, an installation portion 116 may be provided for combination of a detachable electromagnet unit 12, and the installation portion 116 may be concave or penetrative. Further, safe installation wing portions 115 that guide a combination location of the loading unit 120 may be provided in the connection unit 110. The safe installation wing portions 115 may respectively protrude from the connection unit 110 and support the combined loading unit 120.

The connection unit 110 may be formed of a first connection portion 111 combined to the combining portion 114, a second connection portion 112 combined to the first connection portion 112, and a third connection portion 113 combined to the second connection portion 112. The combining portion 114, the first connection portion 111, the second connection portion 112, and the third connection portion 113 are integrally formed thereby forming a single module. Here, the first connection portion 111 and the third connection portion 113 may be respectively provided with the safe installation wing portions 115. Further, the installation portion 116 may be provided in the second connection portion 112.

When the robot according to the exemplary embodiment of the present invention is applied as a rehabilitation robot used to support rehabilitation of a patient, the connection unit 110 is movably combined to the main body of the robot to help rehabilitation of the patient.

The loading unit is detachably combined to the connection unit 110. The loading unit 120 holds an object (e.g., a part of a user's body) to suppress or prevent the object from moving in the loading unit 120.

Holding portions 124 may be provided in the loading unit 120 to fix the object. Each holding portion 124 may include a support wing portion 126 provided in the loading unit 120 and a wing binding portion 128 holding the object by connecting the support wing portions 126 while the object is installed between the support wing portions 126. Each support wing portion 126 protrudes from the loading unit 120 to guide a mounting location of the object. Each support wing portion 126 may be elastically deformed and thus may support the object by surrounding the same in the loading unit 120. In addition, the wing binding portions 128 may connect the support wing portions 126 to each other with various methods to thereby safely hold the object in the loading unit 120. For example, the wing binding portion 128 may be formed of Velcro or an elastic band.

When the robot of the exemplary embodiment of the present invention is used as a rehabilitation robot, the loading unit 120 holds a part of a user's body, i.e., a part of a patient's body, for example, an arm, leg, neck, or waist of the patient to fix the part of the body of the patient to the loading unit 120. Particularly, the part of the patient's body is mounted and then fixed to one side of the loading unit 12, and the other side of the loading unit 120 is detachably combined to the connection unit 110.

The loading unit 120 may be formed of a first loading portion 121, a second loading portion 122 combined to the first loading portion 121, and a third loading portion 123 combined to the second loading portion 122. The first loading portion 121, the second loading portion 122, and the third loading portion 123 are integrally formed, thereby forming a single module. The first loading portion 121 is supported by the first connection portion 111, the second loading portion 122 is supported by the second connection portion 112, and the third loading portion 123 is supported by the third connection portion 113. The first loading portion 121 and the third loading portion 123 may be respectively provided with the holding portion 124. Further, a detachment fixing unit 11 may be provided in the second loading portion 122.

The detachable unit 100 detachably combines the loading unit 120 to the connection unit 110. The detachable unit 100 will be described in the detachable device of the loading unit for the robot according to the exemplary embodiment of the present invention.

The robot according to the exemplary embodiment of the present invention may further include a prismatic joint unit 130.

The prismatic joint unit 130 may adjust the length of the connection unit 110 corresponding to the loading unit 120. The prismatic joint unit 130 may adjust a location for a detailed configuration of the detachable unit 110 provided in the connection unit 110. The prismatic joint unit 130 may be included as a detailed constituent element of the detachable unit 100.

For example, the prismatic joint unit 130 may adjust a location of a second magnet unit 22, a location of a second location selecting unit 32, or a location of the detachable electromagnet unit 12.

The prismatic joint unit 130 may adjust the length of the connection unit 110 or adjust locations of detailed constituent elements of the detachable unit 100 with various methods. In addition, the prismatic joint unit 130 may adjust the length of the connection unit 110 according to a detachment control unit 13, or may adjust locations of detailed constituent elements of the detachable unit 100 provided in the connection unit 110.

In the exemplary embodiment of the present invention, the prismatic joint unit 130 is provided in the second connection portion 112 to adjust the length of the connection unit 110.

The detachable device of the loading unit for the robot according to the exemplary embodiment of the present invention will now be described.

The detachable device of the loading unit for the robot according to the exemplary embodiment of the present invention detachably combines the loading unit 120 to the connection unit 110. The detachable device of the loading unit for the robot according to the exemplary embodiment of the present invention includes a first magnet unit 21, the second magnet unit 22, a pattern recognition unit, and a matching control unit 70.

The first magnet unit 21 is provided in the loading unit 120. The first magnet unit 21 may be provided in the first loading portion 121 of the loading unit 120. Although it is not illustrated, the first magnet unit 21 may be provided in each of the first loading portion 121 and the third loading portion 123.

The first magnet unit 21 has a first magnet pattern. The first magnet pattern may be formed in the first magnet 21 by using polarity and alignment of the magnet. One of a permanent magnet and an electromagnet may be included in the first magnet unit 21. Although it is not illustrated, a magnetic substance that is magnetized by a magnetic force may be included in the first magnet unit 21.

For example, as shown in FIG. 4 and FIG. 5, a plurality of permanent magnets forming the first magnet pattern may be included in the first magnet unit 21. In this case, the first magnet pattern is formed of a predetermined magnet pattern to recognize the loading unit 120, and therefore the first magnet pattern cannot be changed in the loading unit 120. Only one first magnet pattern may be set in a single load unit 120.

Alternatively, as shown in FIG. 6 and FIG. 7, an electromagnet having magnetism produced by applied power may be included in the first magnet unit 21.

The first magnet unit 21 may include a pattern electromagnet portion 21a, a pattern identification portion 21b, and an identification power portion 21c.

The pattern electromagnet portion 21a has magnetism produced by power applied thereto. A plurality of electromagnets arranged in horizontal and vertical directions may be included in the pattern electromagnet portion 21a. Accordingly, the first magnet pattern can be formed in the pattern electromagnet portion 21a according to power applied to the pattern electromagnet portion 21a.

The pattern electromagnet portion 21a may be formed of the second magnet units 22. An interference shielding unit 24 is provided in each pattern electromagnet portion 21a to shield magnetic field interference in the pattern electromagnet portion 21a.

The pattern identification portion 21b selects pattern electromagnet portions 21a among the plurality of pattern electromagnet portions 21a corresponding to the first magnet pattern to apply power. The pattern identification portion 21b is switched as shown in FIG. 6 such that the first magnet pattern of FIG. 5 can be formed.

Although it is not illustrated, the pattern identification portion 21b may select pattern electromagnet portions 21a to apply power among the plurality of pattern electromagnet portions 21a through operation of a user or through an additional control means.

The identification power portion 21c applies power to the pattern electromagnet portions 21a selected by the pattern identification portion 21b among the plurality of pattern electromagnetic portions 21a.

Then, the first magnet pattern can be formed in the pattern electromagnet portion 21a according to the selection operation of the pattern identification portion 21b and the power application operation of the identification power portion 21c. In addition, the first magnet pattern can be variously modified in shape in a single loading unit 120 according to the selection operation of the pattern identification portion 21b and the power application operation of the identification power portion 21c, and a single loading unit 120 can be used with respect to a plurality of objects (e.g., a part of user's body).

Here, the first magnet unit 21 may further include an identification switch portion 21d determining whether to apply power in the identification power portion 21c.

When the loading unit 120 is used, the identification switch portion 21d applies power of the identification power portion 21c to the pattern electromagnet portion 21a, and therefore the first magnet pattern can be modified in the pattern electromagnet portion 21a through the pattern identification portion 21b corresponding to an object held by the loading unit 120.

When the loading unit 120 is not used, the identification switch portion 21d blocks power applied from the identification power portion 21c, and therefore power consumption in the identification power portion 21c can be reduced and deformation of the first magnet pattern due to malfunctioning of the pattern electromagnet portion 21a can be prevented.

The second magnet unit 22 is provided in the connection unit 110. The second magnet unit 22 may be provided in a first connection portion 111 corresponding to the first magnet unit 21. Although it is not illustrated, the second magnet unit 22 may be provided in each of the first connection portion 111 and a third connection portion 113.

The second magnet unit 22 includes a second magnet pattern that corresponds to the first magnet pattern. The second magnet unit 22 is combined with the first magnet unit 21 by a magnetic force according to the power applied thereto. As shown in FIG. 3, the second magnet unit 22 may include a plurality of electromagnets arranged in horizontal and vertical directions. Thus, the second magnet pattern is formed by alignment of the plurality of electromagnets in the second magnet unit 22, and the first magnet pattern or a pattern corresponding to the first magnet pattern can be formed on the second magnet pattern according to power applied to the second magnet unit 22.

The second magnet unit 22 may control polarity of the second magnet pattern according to a programmed control logic. For example, the second magnet unit 22 sets a magnitude and a direction of a magnetic field or a line of magnetic field in the second magnet pattern according to operation of a matching control unit 70 such that the first magnet pattern or the pattern corresponding to the first magnet pattern can be formed in the second magnet pattern.

Here, a part of the second magnet unit 22 may be formed as a permanent magnet or a magnetic substance corresponding to the first magnet pattern of the first magnet unit 21. Alternatively, a part of the second magnet unit 22 may be formed as a permanent magnet corresponding to the first magnet pattern of the first magnet unit 21, which is a magnetic substance. Thus, when the loading unit 120 is placed in an expected position of the connection unit 110, a load of the loading unit 120 can be decreased by a partial magnetic force, and movement of the loading unit 120 can be suppressed or prevented by using a detachable electromagnetic unit 12 or the prismatic joint unit 130 with respect to only one clear pattern.

When the first magnet unit 21 and the second magnet unit 22 are combined by combination of protrusions and grooves respectively formed in the connection unit 110 and the loading unit 120, the first magnet unit 21 and the second magnet 22 may be respectively provided in the protrusions and the grooves. Accordingly, the combination locations of the connection unit 110 and the loading unit 120 can be limited in the combination loading unit 110, and movement of the loading unit 120 in the connection unit 110 can be prevented.

Here, the interference shielding unit 24 that shields an electromagnetic field may be provided in at least one of the first magnet unit 21 and the second magnet unit 22. The interference shielding unit 24 can shield magnetic field interference in at least one of the first magnet unit 21 and the second magnet unit 22. Further, the first magnet pattern or the pattern corresponding to the first magnet pattern can be easily formed on the second magnetic pattern by specifying a location of the first magnet pattern.

The pattern recognition unit recognizes at least one of an object (e.g., a part of user's body) held by the loading unit 120, the first magnet pattern, and the pattern corresponding to the first magnet pattern.

The pattern recognition unit includes at least one of a data input unit 80 and a magnetic sensing unit 23. Input data of the object held by the loading unit 120 is input to the data input unit 80. The magnetic sensing unit 23 is provided in the connection unit 110 and senses the first magnet pattern or the corresponding pattern of the first magnet pattern. The magnetic sensing unit 23 can determine existence of the first magnet pattern on the second magnet pattern. Further, the magnetic sensing unit 23 can sense the magnitude and a direction of a magnetic field or a line of magnetic force of the first magnet pattern on the second magnet pattern.

For example, the input data may indicate unique identification data of the object, which is a patient. Based on the input data, pattern data with respect to the first magnet pattern or pattern data with respect to the pattern corresponding to the first magnet pattern can be set.

In the matching control unit 70, magnetic attraction force is provided to the first magnet pattern from a part of the second magnet pattern according to operation of the pattern recognition unit. The matching control unit 70 controls power applied to the second magnet unit 22. The matching control unit 70 can control power applied to the second location selection unit 32.

Since at least one of the data input unit 80 and the magnetic sensing unit 23 is included in the pattern recognition unit, the matching control unit 70 can control power applied to the second magnet unit 22 according to at least one of a matching result of the input data or the pattern data based on the input data and predetermined matching data and whether or not the magnetic sensing unit 23 sensed the first magnet patter or the corresponding pattern of the first magnet pattern.

That is, when the data input unit 80 is included in the pattern recognition unit, the matching control unit 70 can provide magnetic attraction force to the first magnet pattern from a part of the second magnet pattern by controlling power applied to the second magnet unit 22 according to a result of comparison between the input data or the pattern data based on the input data with predetermined matching data.

In addition, when the magnetic sensing unit 22 is included in the pattern recognition unit, the matching control unit 70 can provide magnetic attraction force to the first magnet pattern from a part of the second magnet pattern by controlling power applied to the second magnet unit 22 according to whether the magnetic sensing unit 23 sensed the first magnet pattern or the corresponding pattern of the first magnet pattern. For example, the magnetic attraction force can be provided to the first magnet pattern by applying power to the electromagnet of the second magnet unit 22 corresponding to the magnetic sensing unit 23 that has sensed the first magnet pattern.

The detachable device of the loading unit for the robot according to the exemplary embodiment of the present invention may further include a matching memory unit 60. The matching memory unit 60 stores matching data corresponding to the first magnet pattern. Thus, predetermined matching data may be formed of matching data stored in the matching memory unit 60.

The detachable device of the loading unit for the robot according to the exemplary embodiment of the present invention may further include a first location selection unit 31 and a second location selection unit 32.

The first location selection unit 31 is provided in the loading unit 120 while being separated from the first magnet unit 21. As the first magnet unit 21 is provided in the first loading portion 121, the first location selection unit 31 may be provided in the third loading unit 123. Here, the first location selection unit 31 may be formed as one of a magnetic substance magnetized by a magnetic force, a permanent magnet, and an electromagnet. For example, the first location selection unit 31 may be formed as the first magnet unit 21.

The second location selection unit 32 is provided in the connection unit 110 while being separated from the second magnet unit 22. As the second magnet unit 22 is provided in the first connection portion 111, the second location selection unit 32 may be provided in the third connection portion 113. The second location selection unit 32 is combined with the first location selection unit 31 by a magnetic force. The second location selection unit 32 may be formed as one of a magnetic substance magnetized by a magnetic force, a permanent magnet, and an electromagnet so as to be combined by a magnetic force corresponding to the first location selection unit 31. For example, the second location selection unit 32 may be formed as the second magnet unit 22.

When the first location selection unit 31 and the second location selection unit 32 are combined by the protrusions and grooves respectively formed in the connection unit 110 and the loading unit 120, the first location selection unit 31 and the second location selection unit 32 may be respectively provided in the protrusions and grooves. Accordingly, a combination location of the loading unit 120 can be limited in the connection unit 110, and movement of the loading unit 120 in the connection unit 110 can be prevented.

The detachable device of the loading unit for the robot according to the exemplary embodiment of the present invention may further include a detachment fixing unit 11, a detachment electromagnet unit 12, and a detachment control unit 13.

The detachment fixing unit 11 is provided in the loading unit 120. The detachment fixing unit 11 is distanced from the first magnet unit 21. The detachment fixing unit 11 may be provided in the second loading unit 122. The detachment fixing unit 11 may be formed of one of a magnetic substance magnetized by a magnetic force, a permanent magnet, and an electromagnet.

The detachment electromagnet unit 12 is provided in the connection unit 110. The detachment electromagnet unit 12 is distanced from the second magnet unit 22. The detachment electromagnet unit 12 is combined to the detachment fixing unit 11 by a magnetic force according to power applied thereto. The detachment electromagnet unit 12 may be provided in the second connection portion. The detachment electromagnet unit 12 may be formed of an installation holding portion 12a combined to the installation portion 116 provided in the connection unit 110, and an installation electromagnet portion 12b combined to the installation holding portion and generating a magnetic force according to power. The installation portion 116 is concave or is penetrated by the connection unit 110, and thus provides magnetic attraction force to the detachment fixing unit 11 by the magnetic force of the installation electromagnet portion 12b, and enables the loading unit 120 to be stably fixed to the connection unit 110.

When the detachment fixing unit 11 and the detachment electromagnet unit 12 are combined by combination of the protrusions and grooves respectively formed in the connection unit 110 and the loading unit 120, the detachment fixing unit 11 and the detachment electromagnet unit 12 may be respectively provided in the protrusions and grooves. Thus, a combination location of the loading unit 120 in the connection unit 110 can be limited, and the loading unit 120 can be prevented from moving in the connection unit 110.

The detachment control unit 13 controls at least one of operation of the connection unit 110 and power applied to the detachment electromagnet unit 12. For example, the detachment control unit 13 checks malfunction of the connection unit 110 to thereby maintain or release a magnetic force generated from the detachment electromagnet unit 12. Alternatively, the detachment control unit 13 checks whether power is applied to the detachment electromagnet unit 12 to thereby maintain or release the magnetic force generated from the detachment electromagnet unit 12.

The detachable device of the loading unit for the robot according to the exemplary embodiment of the present invention may further include a detachment switch unit 90.

The detachment switch unit 90 selects whether to apply power to the detachment electromagnet unit 12. According to the operation of the detachment switch unit 90, power applied to the detachment electromagnet unit 12 can be compulsively blocked. Accordingly, the magnetic force of the detachment electromagnet unit 12 is released such that the detachment fixing unit 11 can be separated and the loading unit 120 can be promptly separated from the connection unit 110.

A detachable device of a loading unit for a robot according to another exemplary embodiment of the present invention may include the detachment fixing unit 11, the detachment electromagnet unit 12, and the detachment control unit 13, and may further include the detachment switch unit 90.

The detachable device of the loading unit for the robot according to the other exemplary embodiment of the present invention may further include the first magnet unit 21, the second magnet unit 22, the pattern recognition unit, and the matching control unit 70. The detachable device of the loading unit for the robot according to the other exemplary embodiment of the present invention may further include the first location selection unit 31 and the second location selection unit 32. In addition, the detachable device of the loading unit for the robot according to the other exemplary embodiment of the present invention may further include the matching memory unit 60.

A detachable device of a loading unit for a robot according to another exemplary embodiment of the present invention may include the first magnet unit 21 and the second magnet unit 22.

The first magnet unit 21 is provided in the loading unit 120 for alignment of the connection unit 110 and the loading unit 120, and includes the first magnet pattern. In addition, the second magnet unit 22 is provided in the connection unit 110, and includes the second magnet pattern where a pattern corresponding to the first magnet pattern is included and is combined with the first magnet unit 21 by a magnetic force. In this case, the first magnet pattern has a unique pattern according to a patient or the loading unit 120.

The second magnet unit 22 is formed as a permanent magnet. In this case, a part of the second magnet unit 22 may be formed as a magnetic substance corresponding to the first magnet pattern of the first magnet unit 21, which is a permanent magnet. In addition, a part of the second magnet unit 22 may be formed as a permanent magnet corresponding to the first magnet pattern of the first magnet unit 21, which is a magnetic substance. Thus, when the loading unit 120 is placed in an expected position of the connection unit 110, a load of the loading unit 120 can be decreased by a partial magnetic force, and movement of the loading unit 120 can be suppressed or prevented by using the detachable electromagnetic unit 12 or the prismatic joint unit 130 with respect to only one clear pattern.

A detachable device of a loading unit for a robot according to another exemplary embodiment of the present invention may include the detachment fixing unit 11, the detachment electromagnet unit 12, and the detachment control unit 13, and may further include the detachment switch unit 90. The detachable device of the loading unit for the robot according to the other exemplary embodiment of the present invention may further include the first location selection unit 31 and the second location selection unit 32. The detachable device of the loading unit for the robot according to the other exemplary embodiment of the present invention may further include the matching memory unit 60.

Figure 8:
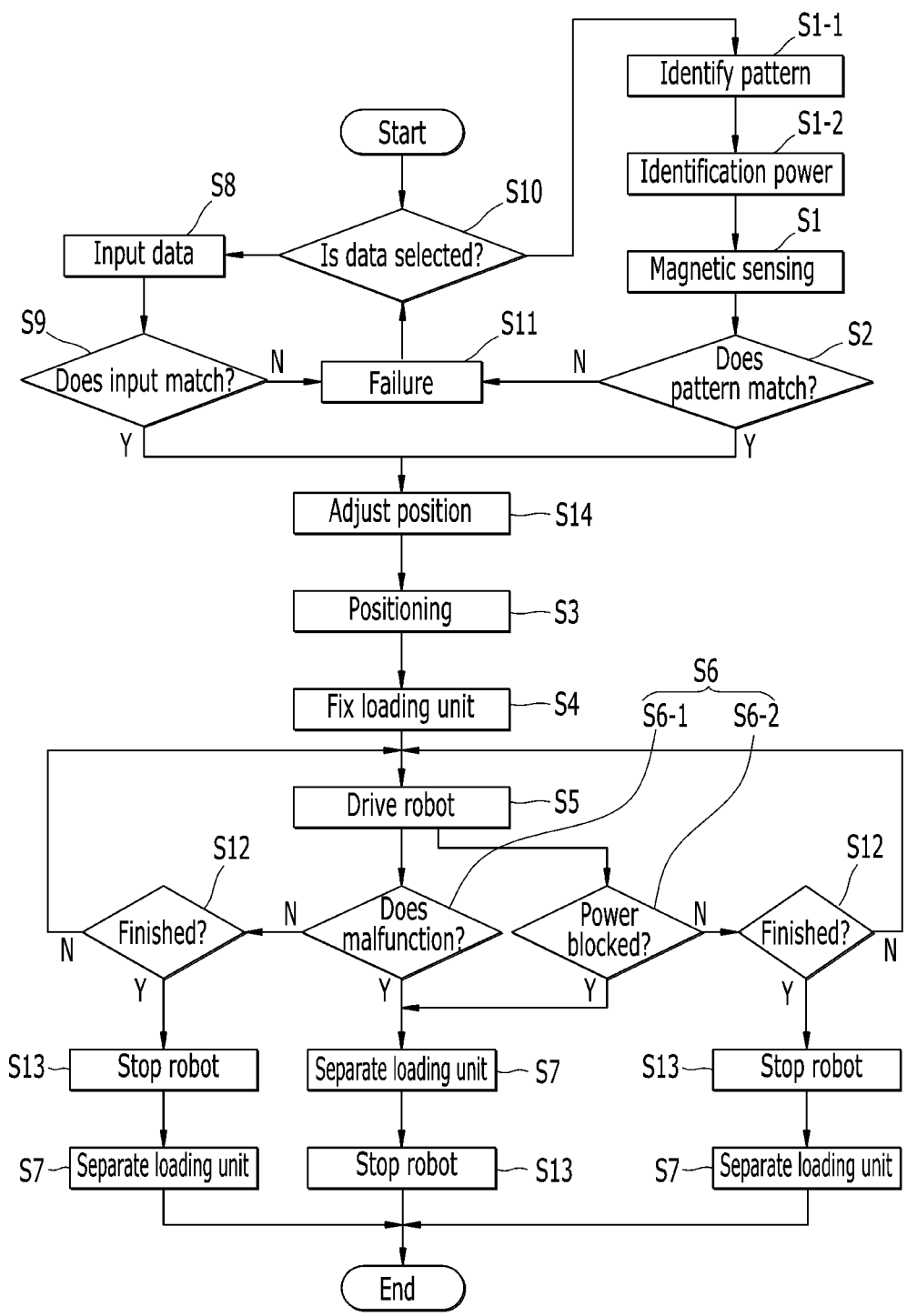
FIG. 8 illustrates a method for controlling a robot according to an exemplary embodiment of the present invention.

Hereinafter, a method for controlling a robot according to an exemplary embodiment of the present invention will be described. FIG. 8 shows a control method of a robot according to an exemplary embodiment of the present invention.

Referring to FIG. 1 to FIG. 8, a control method of a robot according to an exemplary embodiment of the present invention detachably combines the loading unit 120 to the connection unit 110. The method for controlling the robot according to the exemplary embodiment of the present invention includes a pattern recognition process, a recognized data matching process, and a process for placing in the right position (S3).

In the pattern recognition process, when the loading unit 120 is supported by the connection unit 110, one of an object (e.g., a part of user's body) held by the loading unit 120, the first magnet unit 21 provided in the loading unit 120 provided in the loading unit 120, and a pattern corresponding to the first magnet pattern is recognized.

In the pattern recognition process, the object held by the loading unit 120, the first magnet pattern of the first magnet unit 21 provided in the loading unit 120, and the pattern corresponding to the first magnet pattern according to operation of the pattern recognition unit are recognized.

For example, in the pattern recognition process, a data input process (S8) during which input data with respect to the object held by the loading unit 120 is input may be included. In the data input process S8, input data with respect to the object held by the loading unit 120 may be input according to the operation of the data input unit 80.

Here, the input data may indicate unit identification data for a patient who is a user. Based on the input data, pattern data with respect to the first magnet pattern or pattern data with respect to a pattern corresponding to the first magnet pattern can be set.

Alternatively, in the pattern recognition process, a magnetic sensing process (S1) during which the first magnet pattern or a pattern corresponding to the first magnet pattern formed in the first magnet unit 21 may be included. In the magnetic sensing process S1, the first magnet pattern or the pattern corresponding to the first magnet pattern formed in the first magnet unit 21 can be sensed in the second magnet unit 22 according to operation of the magnetic sensing unit 23.

In this case, when the first magnet unit 21 is formed as the electromagnet, the method for controlling the robot according to the exemplary embodiment of the present invention may further include a pattern identification process (S1-1) and an identification power application process (S1-2).

In the pattern identification process (S1-1), before the magnetic sensing process (S1), whether or not to apply power to a part of the plurality of pattern electromagnet portions 21*a* having magnetic force by power applied thereto is selected. In the pattern identification process (S1-1), whether or not to apply power to a part of the plurality of pattern electromagnet portions 21*a* can be selected according to operation of the pattern identification portion 21*b*. In the pattern identification process (S1-1), the first magnet pattern can be changed according to an object (e.g., a part of user's body) held by the loading unit 120 in a single first magnet unit 21.

In the identification power application process (S1-2), power is applied to a part of the plurality of pattern electromagnet portions 21*a*, selected through the pattern identification process (S1-1) to form the first magnet pattern. In the identification power application process (S1-2), power can be applied to the part of the plurality of pattern electromagnet portions 21*a* according to operation of the identification power portion 21*c*. Further, in the identification power application process (S1-2), power of the identification power portion 21*c* can be applied to a part of the plurality of pattern electromagnet portions 21*a* according to operation of the identification switch portion 21*d*.

Here, the pattern recognition process may further include a data selection process S10 to select at least one of the magnetic sensing process (S1) and the data input process (S8). In the data selection process S10, at least one of the magnetic sensing process (S1) and the data input process (S8) can be selected according to operation of the matching control unit 70 and the data input unit 80.

In the recognition data matching process, it is selected whether or not recognition data recognized through the pattern recognition process matches predetermined matching data. Whether or not the recognition data matches the predetermined matching data can be selected according to operation of the recognition data matching unit.

For example, the recognition data matching process may include an input matching process (S9) to select whether or not the input data input through the data input process (S8) matches the predetermined matching data or whether or not the pattern data based on the input data matches the predetermined matching data. In the input matching process (S9), whether or not the input data input through the data input process (S8) matches the predetermined matching data or whether or not the pattern data based on the input data matches the predetermined matching data can be selected according to operation of the matching control unit 70. The recognition data in the above-stated example includes pattern data with respect to the first magnet pattern based on the input data, pattern data with respect to a pattern corresponding to the first magnet pattern based on the input data, or the input data input through the data input process.

Here, when the input data or the pattern data based on the input data matches the predetermined matching data in the input matching process S9, the process for placing in the right position (S3) or a position adjusting process (S14) is performed. Further, when the input data or the pattern data based on the input data does not match the predetermined matching data in the input matching process S9, the pattern recognition process can be performed again. Further, when the input data or the pattern data based on the input data does not match the predetermined matching data in the input matching process S9, a failure process (S11) is performed to display unmatched data and then the pattern recognition process can be performed again.

Alternatively, the data recognition matching process may include a pattern matching process (S2) to select whether the pattern data sensed through the magnetic sensing process (S1) matches predetermined matching data. In the pattern matching process (S2), whether or not the pattern data matches predetermined matching data can be selected according to operation of the matching control unit 70.

Alternatively, the recognition data includes pattern data with respect to the first magnet pattern sensed through the magnetic sensing process or pattern data with respect to a pattern corresponding to the first magnet pattern.

When the pattern data sensed through the magnetic sensing process (S1) matches predetermined matching data in the pattern matching process (S2), the process for placing in the right position (S3) or the position adjusting process (S14) is performed. When the pattern data sensed through the magnetic sensing process (S1) does not match predetermined matching data in the pattern matching process (S2), the pattern recognition process can be performed again. When the pattern data sensed through the magnetic sensing process (S1) does not match predetermined matching data in the pattern matching process (S2), the failure process (S11) is performed to display unmatched data and then the pattern recognition process can be performed again.

In the process for placing in the right position (S3), power is applied to the second magnet unit 22 to provide magnetic attraction force to the first magnet pattern from a part of the second magnet pattern when the recognition data matches predetermined matching data. Power can be applied to the second magnet unit 22 in the process for placing in the right position (S3) according to operation of the matching control unit 70.

For example, when the input data or the pattern data based on the input data matches predetermined matching data, power can be applied to the second magnet unit 22 to provide magnetic attraction force to the first magnet pattern from a part of the second magnet pattern in the process for placing in the right position (S3).

Alternatively, when the pattern data sensed through the magnetic sensing process (S1) matches predetermined matching data, power can be applied to the second magnet unit 22 to provide magnetic attraction force to the first magnet pattern from a part of the second magnet pattern in the process for placing in the right position (S3).

The method for controlling the robot according to the exemplary embodiment of the present invention may further include the position adjusting process (S14).

The position adjusting process (S14) is performed prior to the process for placing in the right position (S3). In the position adjusting process (S14), the length of the connection unit 110 is adjusted corresponding to the loading unit 120. Further, in the position adjusting process (S14), positions of detailed constituent elements of the detachable unit 100 provided in the connection unit 110 can be adjusted corresponding to the loading unit 120. For example, in the position adjusting process (S14), a position of the second magnet unit 22, a position of the second location selecting unit 32, or a position of the detachment electromagnet unit 12 can be adjusted corresponding to the loading unit 120.

In the position adjusting process (S14), the length of the connection unit 110 may be adjusted or the positions of the constituent elements of the detachable unit 100 provided in the connection unit 110 can be adjusted according to operation of the prismatic joint unit 130.

Thus, when a specific loading unit 120 is selected and then the pattern recognition process is performed, the length of the connection unit 110 may be adjusted or positions of the detailed constituent elements of the detachable unit 100 can be adjusted according to predetermined matching data corresponding to the recognition data.

For example, when data of a patient who is a user is input, the length of the connection unit 110 can be automatically adjusted according to the data of the user.

The method for controlling the robot according to the exemplary embodiment of the present invention may further include a loading unit fixing process (S4).

The loading unit fixing process S4 is performed after the process for placing in the right position (S3). In the loading unit fixing process S4, power is applied to the detachable electromagnet unit 12 to combine the detachable fixing unit 11 provided in the loading unit 120 by a magnetic force generated from the detachable electromagnet unit 12 provided in the connection unit 110. In the loading unit fixing process S4, power can be applied to the detachable electromagnet unit 12 by control of the detachment control unit 13.

The method for controlling the robot according to the exemplary embodiment of the present invention may further include an operation check process (S6).

The operation check process (S6) is performed according to movement of the connection unit 110. In the operation check process (S6), at least one of operation of the connection unit 110 and power applied in the loading unit fixing process (S4) is checked. The operation check process (S6) can be performed by control of the detachment control unit 13. The operation check process S6 can be divided into a robot check process (S6-1) for checking operation of the connection unit 110 and a power check process (S6-2) for checking power applied in the loading unit fixing process (S4).

Here, a process S5 is a robot driving process for driving a robot where the connection unit 110 is included. The robot driving process S5 can maintain operation of the connection unit 110 with a predetermined operation condition by letting the connection unit 110 move according to operation of the detachment control unit 13.

Through the operation check process (S6), a loading unit separation process (S7) is performed when at least one of malfunction of the connection unit 110 and blocking of power applied in the loading unit fixing process (S4) is selected.

In the loading unit separation process (S7), the magnetic force of the detachable electromagnet unit 12 is released to release the combination of the detachment electromagnet unit 12 and the detachment fixing unit 11. In the loading unit separation process (S7), power applied to the detachable electromagnet unit 12 is blocked according to operation of the detachment control unit 13 or power applied to the detachable electromagnet unit 12 is blocked according to operation of the detachment switch unit 90 to release the magnetic force of the detachment electromagnet unit 12.

When the magnetic force of the detachment electromagnet unit 12 is released, the loading unit 120 can be separated from the connection unit 110 such that the loading unit 120 and the object held by the loading unit 120 can be protected from the connection unit 110 under a dangerous situation.

For example, when the malfunction of the connection unit 110 is selected through the robot check process (S6-1), the loading unit separation process (S7) can be performed. Alternatively, when blocking of power applied to the loading unit fixing process (S4) is selected through the power check process (S6-2), the loading unit separation process (S7) can be performed.

Through the operation check process (S6), the normal operation of the connection unit 110 is maintained and the power is continuously applied during the loading unit fixing process (S4), and the robot driving process (S5) is continuously performed to maintain driving of the robot.

In this case, when the normal operation of the connection unit 110 is maintained and power application during the loading unit fixing process (S4) is maintained through the operation check process (S6), a completion check process (S12) can be performed.

The completion check process (S12) is performed to select whether operation of the connection unit 110 is completed. In the completion check process (S12), whether or not operation of the connection unit 110 is completed can be selected according to operation of the detachment control unit 13.

When it is selected in the completion check process (S12) that the operation of the connection unit 110 is not completed, the robot driving process (S5) can be performed to maintain operation of the connection unit 110.

When it is selected in the completion check process (S12) that the operation of the connection unit 110 is completed, a robot stopping process (S13) for stopping operation of the connection unit 110 and the loading unit separation process (S7) for releasing the magnetic force applied to the detachment electromagnet unit 12 can be sequentially performed. Completion of driving of the robot can be determined through sequential performance of the robot stopping process (S13) and the loading unit separation process (S7), the loading unit 120 can be stably separated from the connection unit 110, and detachment of the loading unit 120 by an external force while the robot is being driven can be prevented to thereby protect the loading unit 120 and the object held by the loading unit 120.

A method for controlling a robot according to another exemplary embodiment of the present invention may include the process for placing in the right position (S4), the loading unit fixing process (S4), and the operation check process (S6). In addition, the method for controlling the robot according to the other exemplary embodiment of the present invention may further include the pattern recognition process and the recognition data matching process. Further, the method for controlling the robot according to the other exemplary embodiment of the present invention may further include the pattern identification process (S1-1) and the identification power application process (S1-2). In addition, the method for controlling the robot according to the other exemplary embodiment of the present invention may further include the position adjusting process (S14).

Here, the process for placing in the right position (S3) is sufficient if the loading unit 120 can be placed in the right position in the connection unit 110, and the process for placing in the right position (S3) can be specified through the pattern recognition process and the recognition data matching process.

According to the above-described detachable device of the loading unit for the robot, the robot using the same, and the method for controlling the robot, the loading unit 120 can be stably combined to the connection unit 110 according to an object held by the loading unit 120, and the loading unit 120 can be promptly separated from the connection unit 110 under a dangerous situation to thereby protect the object held by the loading unit 120.

In addition, the loading unit 120 can be detachable from the connection unit such that an accident of the object held by the loading unit 120 due to malfunction of the robot can be prevented.

Further, when being applied to a rehabilitation robot, the loading unit 120 that holds a body part of a user can be specified according to a characteristic of the user, the loading unit 120 can be easily attached to or detached from the rehabilitation robot, and an accident of the user held by the loading unit 120 can be prevented and the user can be promptly escaped from the rehabilitation robot in an emergency situation.

Further, the loading unit 120 can be placed in the right position in the connection unit 110 through detailed constituent elements of the first magnet unit 21, and the loading unit 120 can be prevented from moving in the connection unit 110 before the loading unit 120 is completely fixed thereto.

In addition, the loading unit 120 can be specified according to an object through the detailed constituent elements of the first magnet unit 21 to change data of the object, and operation of the detachable unit 100 can be controlled according to a use state or use of the loading unit 120. Particularly, when being applied to a rehabilitation robot, the loading unit 120 can be specified according to a patient, and an individual loading unit 120 is set for each patient and thus when the loading unit 120 is fixed to the connection unit 120, rehabilitation treatment can be automatically formed for the corresponding patient.

In addition, in recognition of the first magnet pattern, interference of the magnetic field between the first magnet unit 21 and the second magnet unit 22 can be prevented and a recognition rate of the first magnet pattern can be improved.

Further, before the loading unit 120 is completely fixed to the connection unit 110, the location of the loading unit 120 can be specified and movement of the loading unit 120 in the connection unit 110 can be prevented. In addition, the connection unit 110 can be automated through matching data, and data of operation of the robot can be stored. Particularly, when being applied to the rehabilitation robot, a rehabilitation state of a patient can be checked and managed, and the rehabilitation treatment can be automatically provided to the patient according to a rehabilitation schedule of the patient.

Further, a failure due to errors in a computer can be solved through the data input unit 80, and an operation state of the robot can be set or initialized. Particularly, when being applied to the rehabilitation robot, unregistered general patients can be provided with rehabilitation treatment, and rehabilitation exercise intensity of the patent can be adjusted. In addition, the loading unit 120 can be promptly separated from the robot corresponding to any situation.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 11: detachment fixing unit | 12: detachment electromagnet unit |
| 12a: installation holding portion | |
| 12b: installation electromagnet portion | 13: detachment control unit |
| 21: first magnet unit | |
| 21a: pattern electromagnet portion | 21b: pattern identification portion |
| 21c: identification power portion | |
| 21d: identification switch portion | 22: second magnet unit |
| 23: magnetic sensing unit | |
| 24: interference shielding unit | 31: first location selection unit |
| 32: second location selection unit | |
| 60: matching memory unit | 70: matching control unit |
| 80: data input unit | |
| 90: detachment switch unit | 100: detachable unit |
| 110: connection unit | |
| 111: first connection portion | 112: second connection portion |
| 113: third connection portion | |
| 114: connection combining portion | 115: safe installation wing portion |
| 116: installation portion | |
| 120: loading unit | 121: first loading portion |
| 122: second loading portion | |
| 123: third loading portion | 124: holding portion |
| 126: support wing portion | |
| 128: wing binding portion | 130: prismatic joint unit |

-continued

| <Description of symbols> | |
|---|---|
| S1: magnetic sensing process | S1-1: pattern identification process |
| S1-2: identification power application process | |
| S2: pattern matching process | S3: right positioning process |
| S4: loading unit fixing process | |
| S5: robot driving process | S6: operation check process |
| S6-1: robot check process | |
| S6-2: power check process | |
| S7: loading unit separation process | |
| S8: data input process | |
| S9: input matching process | S10: data selection process |
| S11: failure process | |
| S12: completion check process | S13: robot stopping process |
| S14: position adjusting process | |

What is claimed is:

1. A detachable device of a loading unit for a robot, detachably combining the loading unit to a connection unit of the robot, comprising:
   a first magnet unit provided in the loading unit and having a first magnet pattern;
   a second magnet unit provided in the connection unit, having a second magnet pattern including a pattern that corresponds to the first magnet pattern, and combined with the first magnet unit by a magnetic force generated by power applied thereto;
   a pattern recognition unit recognizing an object held by the loading unit and one of the first magnet pattern and the pattern corresponding to the first magnet pattern; and
   a matching control unit controlling power applied to the second magnet unit to apply magnetic attraction force to the first magnet pattern from a part of the second magnet pattern according to operation of the pattern recognition unit,
   wherein the pattern recognition unit comprises at least one of a data input unit to which input data with respect to an object held by the loading unit is input and a magnetic sensing unit provided in the connection unit and sensing the first magnet pattern or a pattern corresponding to the first magnet pattern, and
   the matching control unit controls power applied to the second magnet unit according to at least one of a result of matching the input data or pattern data based on the input data with predetermined matching data and whether or not the magnetic sensing unit sensed the first magnet pattern or the corresponding pattern of the first magnet pattern.

2. The detachable device of the loading unit for the robot of claim 1, wherein the first magnet unit comprises a plurality of permanent magnets forming the first magnet pattern, and the first magnet pattern is a predetermined magnet pattern for identification of the loading unit.

3. A detachable device of a loading unit for a robot, detachably combining the loading unit to a connection unit of the robot, comprising:
   a first magnet unit provided in the loading unit and having a first magnet pattern;
   a second magnet unit provided in the connection unit, having a second magnet pattern including a pattern that corresponds to the first magnet pattern, and combined with the first magnet unit by a magnetic force generated by power applied thereto;
   a pattern recognition unit recognizing an object held by the loading unit and one of the first magnet pattern and the pattern corresponding to the first magnet pattern; and
   a matching control unit controlling power applied to the second magnet unit to apply magnetic attraction force to the first magnet pattern from a part of the second magnet pattern according to operation of the pattern recognition unit, wherein the first magnet unit comprises:
   a plurality of pattern electromagnet portion having a magnetic force by power applied thereto;
   a pattern identification portion selecting whether to apply power to a part of the plurality of pattern electromagnet portions corresponding to the first magnet pattern; and
   an identification power portion applying power to the part selected by the pattern identification portion among the plurality of pattern electromagnet portions to form the first magnet pattern.

4. A detachable device of a loading unit for a robot, detachably combining the loading unit to a connection unit of the robot, comprising:
   a first magnet unit provided in the loading unit and having a first magnet pattern;
   a second magnet unit provided in the connection unit, having a second magnet pattern including a pattern that corresponds to the first magnet pattern, and combined with the first magnet unit by a magnetic force generated by power applied thereto;
   a pattern recognition unit recognizing an object held by the loading unit and one of the first magnet pattern and the pattern corresponding to the first magnet pattern; and
   a matching control unit controlling power applied to the second magnet unit to apply magnetic attraction force to the first magnet pattern from a part of the second magnet pattern according to operation of the pattern recognition unit, wherein at least one of the first magnet unit and the second magnet unit is provided with an interference shielding unit that shields an electric field.

5. The detachable device of the loading unit for the robot of claim 1, further comprising a second position selection unit provided in the connection unit while being separated from the second magnet unit and combined with the first position selection unit by a magnetic force.

6. A detachable device of a loading unit for a robot, detachably combining the loading unit to a connection unit of the robot, comprising:
   a first magnet unit provided in the loading unit and having a first magnet pattern;
   a second magnet unit provided in the connection unit, having a second magnet pattern including a pattern that corresponds to the first magnet pattern, and combined with the first magnet unit by a magnetic force generated by power applied thereto;

a pattern recognition unit recognizing an object held by the loading unit and one of the first magnet pattern and the pattern corresponding to the first magnet pattern; and a matching control unit controlling power applied to the second magnet unit to apply magnetic attraction force to the first magnet pattern from a part of the second magnet pattern according to operation of the pattern recognition unit, further comprising:

a detachment fixing unit provided in the loading unit while being separated from the first magnet unit;

a detachment electromagnet unit provided in the connection unit while being separated from the second magnet unit and combined to the detachment fixing unit by a magnetic force generated by power applied thereto; and a detachment control unit controlling at least one of operation of the connection unit and power applied to the detachment electromagnet unit.

7. The detachable device of the loading unit for the robot of claim 6, further comprising a detachment switch unit selecting whether power is applied in the detachment electromagnet unit.

* * * * *